United States Patent
Parkinson et al.

(10) Patent No.: US 9,640,199 B2
(45) Date of Patent: May 2, 2017

(54) LOCATION TRACKING FROM NATURAL SPEECH

(71) Applicant: Kopin Corporation, Westborough, MA (US)

(72) Inventors: Christopher Parkinson, Richland, WA (US); Jeffrey J. Jacobsen, Hollister, CA (US); Shai Leib, Rocklin, CA (US)

(73) Assignee: KOPIN CORPORATION, Westborough, MA (US)

( * ) Notice: Subject to any disclaimer, the term of this patent is extended or adjusted under 35 U.S.C. 154(b) by 121 days.

(21) Appl. No.: 14/573,835

(22) Filed: Dec. 17, 2014

(65) Prior Publication Data

US 2015/0187371 A1    Jul. 2, 2015

Related U.S. Application Data

(60) Provisional application No. 61/921,307, filed on Dec. 27, 2013.

(51) Int. Cl.
| | |
|---|---|
| *H03G 3/20* | (2006.01) |
| *G10L 25/48* | (2013.01) |
| *G10L 17/22* | (2013.01) |
| *H04R 1/08* | (2006.01) |
| *H04R 1/10* | (2006.01) |
| *G10L 15/22* | (2006.01) |
| *G01C 21/20* | (2006.01) |

(52) U.S. Cl.
CPC ............ *G10L 25/48* (2013.01); *G01C 21/206* (2013.01); *G10L 15/22* (2013.01); *G10L 17/22* (2013.01); *H04R 1/08* (2013.01); *H04R 1/1091* (2013.01)

(58) Field of Classification Search
CPC ........ G10L 25/48; G10C 21/20; H04R 1/1091
See application file for complete search history.

(56) References Cited

U.S. PATENT DOCUMENTS

| | | |
|---|---|---|
| 6,748,225 B1 | 6/2004 | Kepler |
| 2003/0176965 A1 | 9/2003 | Padmanabhan |
| 2011/0187640 A1 | 8/2011 | Jacobsen et al. |
| 2014/0033071 A1* | 1/2014 | Gruber ............... G06Q 10/1097 715/752 |

FOREIGN PATENT DOCUMENTS

WO    WO2015/100107    7/2015

OTHER PUBLICATIONS

Padmanabhan, V.; "LandLoc: Landmark-based User Location" Microsoft Research; Technical Report; MSR-=TR-2001-23; Jan. 2001.

International Search Report and Written Opinion of PCT/US2014/070909 dated Mar. 25, 2015 entitled "Location Tracking From Natural Speech".

International Report on Patentability for PCT/US2014/070909 dated Jul. 7, 2016 entitled "Location Tracking From Natural Speech".

* cited by examiner

*Primary Examiner* — Regina N Holder
(74) *Attorney, Agent, or Firm* — Hamilton, Brook, Smith & Reynolds, P.C.

(57) ABSTRACT

A headset computer device provides user voice indication of location of the device. The user may implicitly or explicitly present by voice input his and hence the HSC device location. A voice driven location module is coupled to the voice recognition engine, a map database and GPS of the HSC device. Based on user voiced indications of 3D space location, the voice driven location module determines device location and resets 3D space location accordingly.

20 Claims, 5 Drawing Sheets

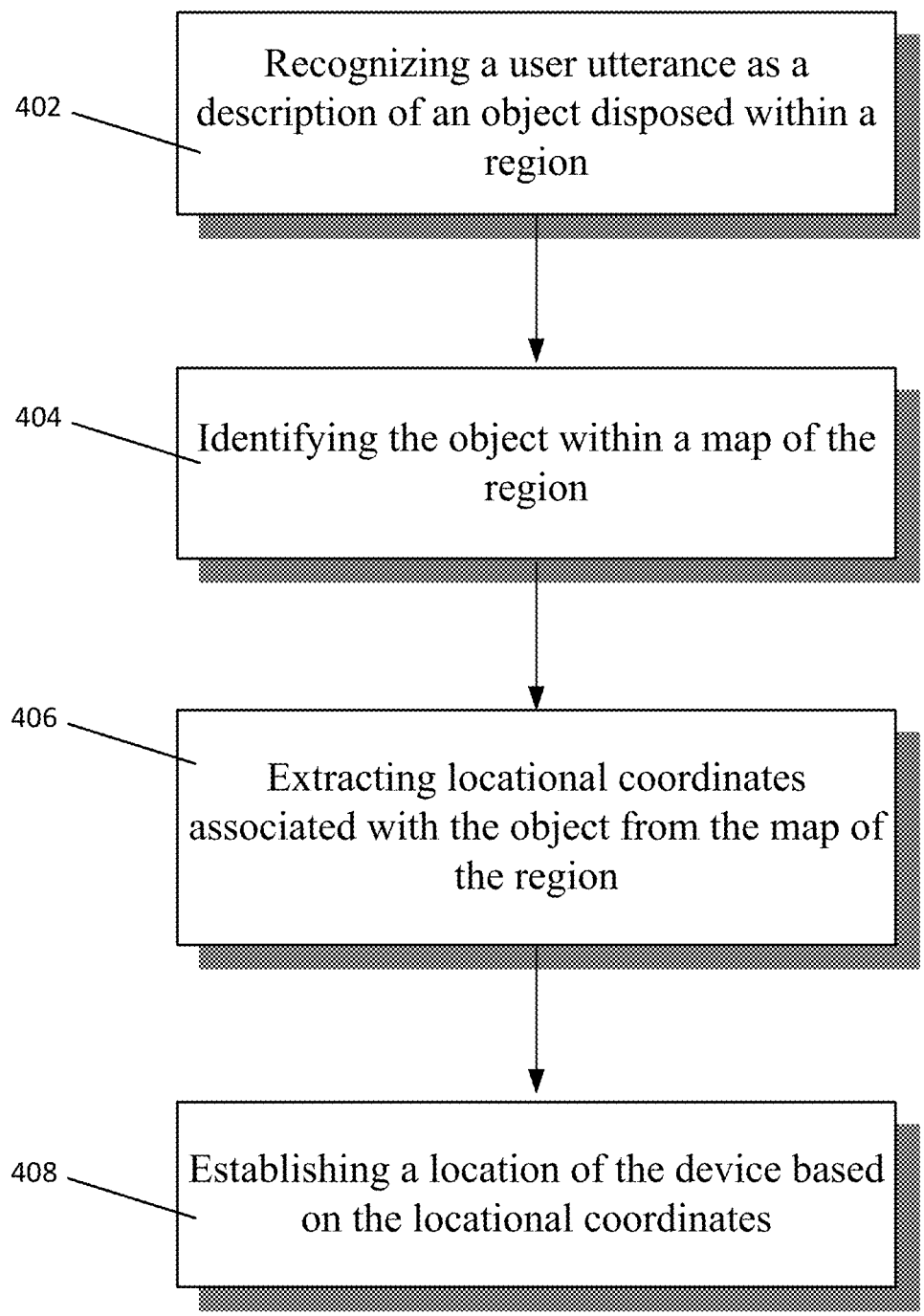

LOCATION TRACKING FROM NATURAL SPEECH

RELATED APPLICATION

This application claims the benefit of U.S. Provisional Application No. 61/921,307, filed on Dec. 27, 2013. The entire teachings of the above application(s) are incorporated herein by reference.

BACKGROUND OF THE INVENTION

Mobile computing devices, such as a laptop or notebook PC, a smart phone, and tablet computing device, are now common tools used for producing, analyzing, communicating, and consuming data in both business and personal life. Consumers continue to embrace a mobile digital lifestyle as the ease of access to digital information increases with high speed wireless communications technologies becoming ubiquitous. Popular uses of mobile computing devices include displaying large amounts of high-resolution computer graphics information and video content, often wirelessly streamed to the device. While these devices typically include a display screen, the preferred visual experience of a high resolution, large format display cannot be easily replicated in such mobile devices because the physical size of such device is limited to promote mobility. Another drawback of the aforementioned device types is that the user interface is hands-dependent, typically requiring a user to enter data or make selections using a keyboard (physical or virtual) or touch-screen display. As a result, consumers are now seeking a hands-free, high quality, portable, color display solution to augment or replace their hands-dependent mobile devices.

Location awareness is increasingly important in many aspects of personal computing, especially those involving mobile devices. The standard way of obtaining location is to rely on GPS chipsets built into the device itself. However this only works reliably when the device has a clear line-of-sight view of the GPS satellites overhead. When operating indoors this is rarely the case, and GPS often fails to return an accurate position when within four walls. Several alternative indoor positioning methods exist, including inertial navigation and wireless beaconing. Inertial navigation uses accelerometers to track movement with respect to an initial position. Wireless beaconing uses fixed location wireless radio antennas (radio beacons) attached to structures, along with various forms of radio triangulation, to calculate exact or approximate mobile user position. Various wireless protocols may be used, for example WiFi, Cellular, and Bluetooth.

All of these indoor methods have limitations. Wireless beaconing requires extensive infrastructure to be set up and maintained.

The accelerometers used for inertial navigation have accuracy limitations, so that position calculations based on them suffer from "drift." The longer time period over which inertial navigation (also referred to as dead reckoning navigation) is used, the more total "drift" is accumulated, which corresponds to error in the user's estimated location or position.

The state of the art approach to indoor navigation currently combines aspects of both wireless beaconing with accelerometer tracking Such a positioning device obtains an accurate fix of its indoor location by way of a short range wireless beacon. Once the fix is obtained, accelerometers try to keep the location estimate up to date as the device moves out of range of distributed, non-overlapping beacons.

Accelerometers may have a drift of about 5-10%. That means after walking around 100 feet following the last fix from a beacon, it is expected that that device's position estimate may be in error by +/−5 to 10 feet.

SUMMARY OF THE INVENTION

Recently developed micro-displays can provide large-format, high-resolution color pictures and streaming video in a very small form factor. One application for such displays can be integrated into a wireless headset computer worn on the head of the user with a display within the field of view of the user, similar in format to eyeglasses, audio headset or video eyewear.

A "wireless computing headset" device, also referred to herein as a headset computer (HSC) or head mounted display (HMD), includes one or more small, high resolution micro-displays and associated optics to magnify the image. The high resolution micro-displays can provide super video graphics array (SVGA) (800×600) resolution or extended graphic arrays (XGA) (1024×768) resolution, or higher resolutions known in the art.

A wireless computing headset contains one or more wireless computing and communication interfaces, enabling data and streaming video capability, and provides greater convenience and mobility through hands dependent devices.

For more information concerning such devices, see co-pending patent applications entitled "Mobile Wireless Display Software Platform for Controlling Other Systems and Devices," U.S. application Ser. No. 12/348, 648 filed Jan. 5, 2009, "Handheld Wireless Display Devices Having High Resolution Display Suitable For Use as a Mobile Internet Device," PCT International Application No. PCT/US09/38601 filed Mar. 27, 2009, and "Improved Headset Computer," U.S. Application No. 61/638,419 filed Apr. 25, 2012, each of which are incorporated herein by reference in their entirety.

As used herein "HSC" headset computers, "HMD" head mounted display device, and "wireless computing headset" device may be used interchangeably.

Embodiments of the present invention concern using speech utterances to enhance and/or replace the wireless beaconing. In addition to all other forms of inertial navigation and dead reckoning using radio beacons and accelerometers to estimate a mobile users location or position and to periodically reset the location of the tracking device, one or more spoken words can be used to accurately position or locate a mobile user against a known floor plan, schematic or map. This would be especially true of head-worn devices already driven primarily by voice, which are designed to listen for and understand speech commands.

In one aspect, the invention is a headset computer device including a microdisplay driven by a processor, a microphone coupled to provide user-voiced input to the processor, and a voice location module. The voice location module is executed by the processor, and is configured to establish a location of the device based on the user-voiced input.

In one embodiment, the processor resets the established location based on the user-voiced input. In another embodiment, the voice location module is further configured to establish the location of the device within a three dimensional coordinate system. In another embodiment, the user-voiced input is in response to a solicitation from the headset computer device. Such a solicitation may include a message presented on the microdisplay, an audible message, or other such message communicated to the user.

In another embodiment, the headset computer device is further configured to extract the user-voiced input from unsolicited utterances. The unsolicited utterances may include utterances spoken by the user during the normal course of his activities, or they may be specifically submitted by the user as, for example, a user's intentional attempt to provide location information to the headset computer device. In one embodiment, the user-voiced input includes information describing proximity to an object, landmark or building feature (e.g., visitor alcove or secretary station).

In another embodiment, the headset computer device is further configured to cross-reference the information describing proximity to an object with a reference plan of known objects. In one embodiment the headset computer device is further configured to identify a match between the information describing proximity to an object and a known object described in the reference plan.

In one embodiment, the headset computer is further configured to use inertial navigation to determine a subsequent location of the device, after the voice location module establishes the location of the device.

In another aspect, the invention is a method of enhancing a location system, including recognizing a user utterance as a description of an object disposed within a region, identifying the object within a map of the region, extracting locational coordinates associated with the object from the map of the region, and establishing a location of the device based on the locational coordinates.

In one embodiment, the method further includes resetting the established location based on the user voiced input. In another embodiment, the method further includes establishing the location of the device within a three dimensional coordinate system.

In another embodiment, the method further includes cross-referencing the information describing proximity to an object with a reference plan of known objects. In one embodiment, the method further includes identifying a match between the information describing proximity to an object and a known object described in the reference plan.

Another embodiment further includes using inertial navigation to determine a subsequent location of the device, after the voice location module establishes the location of the device.

In another aspect, the invention includes a non-transitory computer-readable medium for recognizing speech, the non-transitory computer-readable medium comprising computer software instructions stored thereon. The computer software instructions, when executed by at least one processor, causes a computer system to recognize a user utterance as a description of an object disposed within a region, identify the object within a map of the region, extract locational coordinates associated with the object from the map of the region, and establish a location of the device based on the locational coordinates.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 4 illustrates an embodiment of a method of enhancing a location system according to the invention.

DETAILED DESCRIPTION OF THE INVENTION

A description of example embodiments of the invention follows.

The teachings of all patents, published applications and references cited herein are incorporated by reference in their entirety.

Figure 1A:
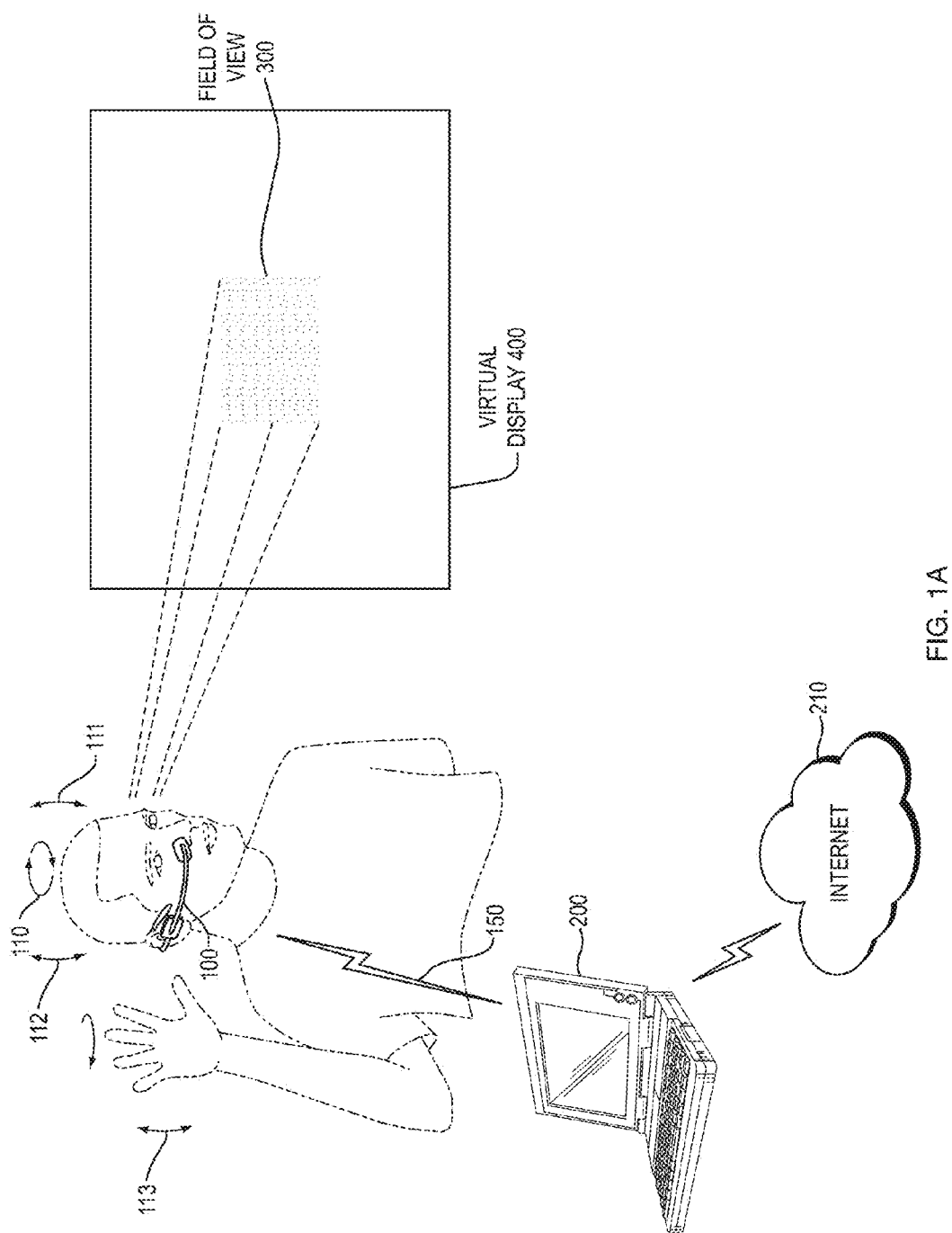
FIGS. 1A-1B are schematic illustrations of a headset computer cooperating with a host computer (e.g., Smart Phone, laptop, etc.) according to principles of the present invention.
Figure 1B:
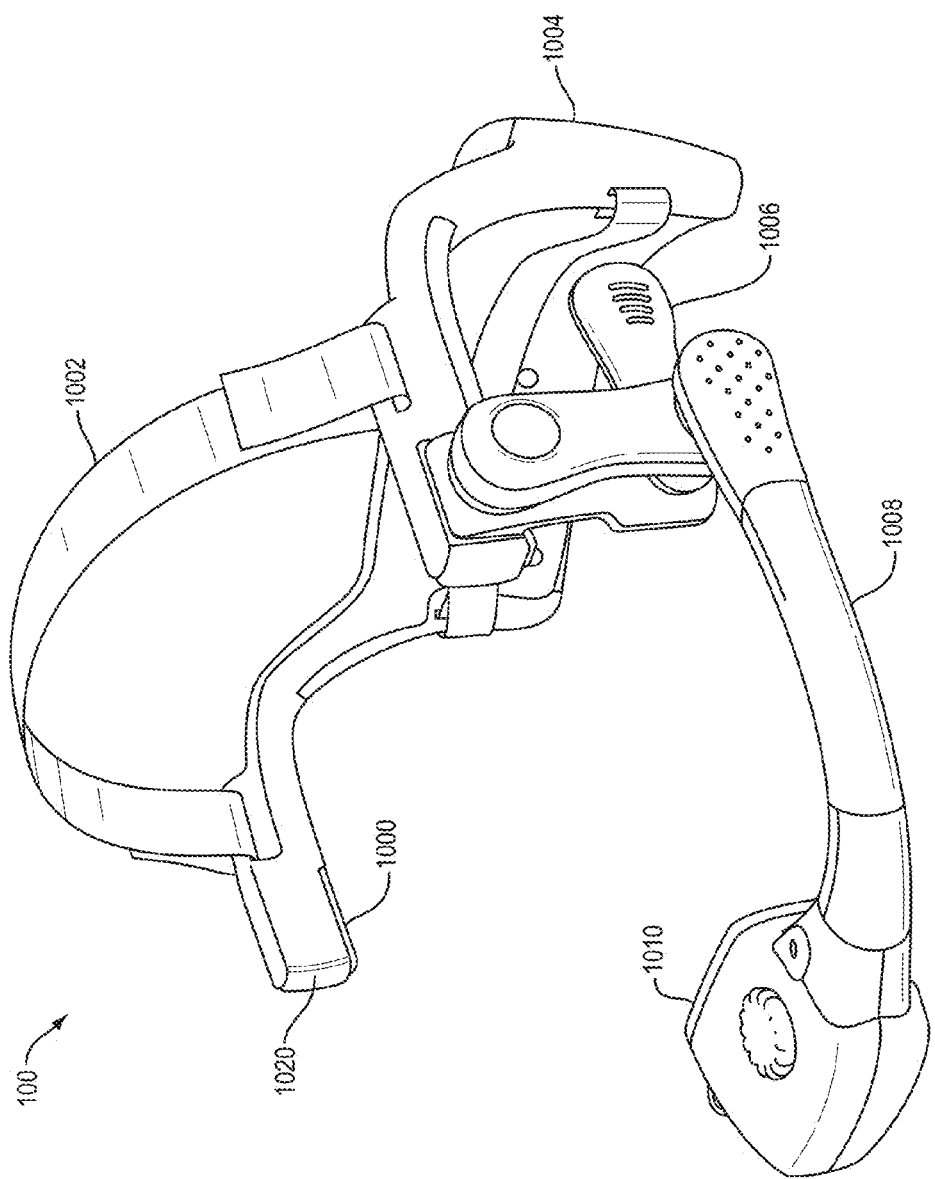

FIGS. 1A and 1B show an example embodiment of a wireless computing headset device 100 (also referred to herein as a headset computer (HSC) or head mounted display (HMD)) that incorporates a high-resolution (VGA or better) micro-display element 1010, and other features described below.

HSC 100 can include audio input and/or output devices, including one or more microphones, input and output speakers, geo-positional sensors (GPS), three to nine axis degrees of freedom orientation sensors, atmospheric sensors, health condition sensors, digital compass, pressure sensors, environmental sensors, energy sensors, acceleration sensors, position, attitude, motion, velocity and/or optical sensors, cameras (visible light, infrared, etc.), multiple wireless radios, auxiliary lighting, rangefinders, or the like and/or an array of sensors embedded and/or integrated into the headset and/or attached to the device via one or more peripheral ports 1020 (FIG. 1B).

Typically located within the housing of headset computing device 100 are various electronic circuits including, a microcomputer (single or multicore processors), one or more wired and/or wireless communications interfaces, memory or storage devices, various sensors and a peripheral mount or mount, such as a "hot shoe."

Example embodiments of the HSC 100 can receive user input through sensing voice commands, head movements, 110, 111, 112 and hand gestures 113, or any combination thereof. A microphone (or microphones) operatively coupled to or integrated into the HSC 100 can be used to capture speech commands, which are then digitized and processed using automatic speech recognition techniques. Gyroscopes, accelerometers, and other micro-electromechanical system sensors can be integrated into the HSC 100 and used to track the user's head movements 110, 111, 112 to provide user input commands. Cameras or motion tracking sensors can be used to monitor a user's hand gestures 113 for user input commands. Such a user interface may overcome the disadvantages of hands-dependent formats inherent in other mobile devices.

The HSC 100 can be used in various ways. It can be used as a peripheral display for displaying video signals received and processed by a remote host computing device 200 (shown in FIG. 1A). The host 200 may be, for example, a notebook PC, smart phone, tablet device, or other computing device having less or greater computational complexity than the wireless computing headset device 100, such as cloud-based network resources. The headset computing device 100 and host 200 can wirelessly communicate via one or more wireless protocols, such as Bluetooth®, Wi-Fi, WiMAX, 4G LTE or other wireless radio link 150. (Bluetooth is a registered trademark of Bluetooth Sig, Inc. of 5209 Lake Washington Boulevard, Kirkland, Wash. 98033).

In an example embodiment, the host 200 may be further connected to other networks, such as through a wireless connection to the Internet or other cloud-based network resources, so that the host 200 can act as a wireless relay between the HSC 100 and the network 210. Alternatively, some embodiments of the HSC 100 can establish a wireless connection to the Internet (or other cloud-based network resources) directly, without the use of a host wireless relay. In such embodiments, components of the HSC 100 and the host 200 may be combined into a single device.

FIG. 1B is a perspective view showing some details of an example embodiment of a headset computer 100. The example embodiment HSC 100 generally includes, a frame 1000, strap 1002, rear housing 1004, speaker 1006, cantilever, or alternatively referred to as an arm or boom 1008 with a built in microphone, and a micro-display subassembly 1010.

A head worn frame 1000 and strap 1002 are generally configured so that a user can wear the headset computer device 100 on the user's head. A housing 1004 is generally a low profile unit which houses the electronics, such as the microprocessor, memory or other storage device, along with other associated circuitry. Speakers 1006 provide audio output to the user so that the user can hear information. Micro-display subassembly 1010 is used to render visual information to the user. It is coupled to the arm 1008. The arm 1008 generally provides physical support such that the micro-display subassembly is able to be positioned within the user's field of view 300 (FIG. 1A), preferably in front of the eye of the user or within its peripheral vision preferably slightly below or above the eye. Arm 1008 also provides the electrical or optical connections between the micro-display subassembly 1010 and the control circuitry housed within housing unit 1004.

According to aspects that will be explained in more detail below, the HSC display device 100 allows a user to select a field of view 300 within a much larger area defined by a virtual display 400. The user can typically control the position, extent (e.g., X-Y or 3D range), and/or magnification of the field of view 300.

While what is shown in FIGS. 1A and 1B is a monocular micro-display presenting a single fixed display element supported on the face of the user with a cantilevered boom, it should be understood that other mechanical configurations for the remote control display device 100 are possible, such as a binocular display with two separate micro-displays (e.g., one for each eye) or a single micro-display arranged to be viewable by both eyes.

Figure 2:
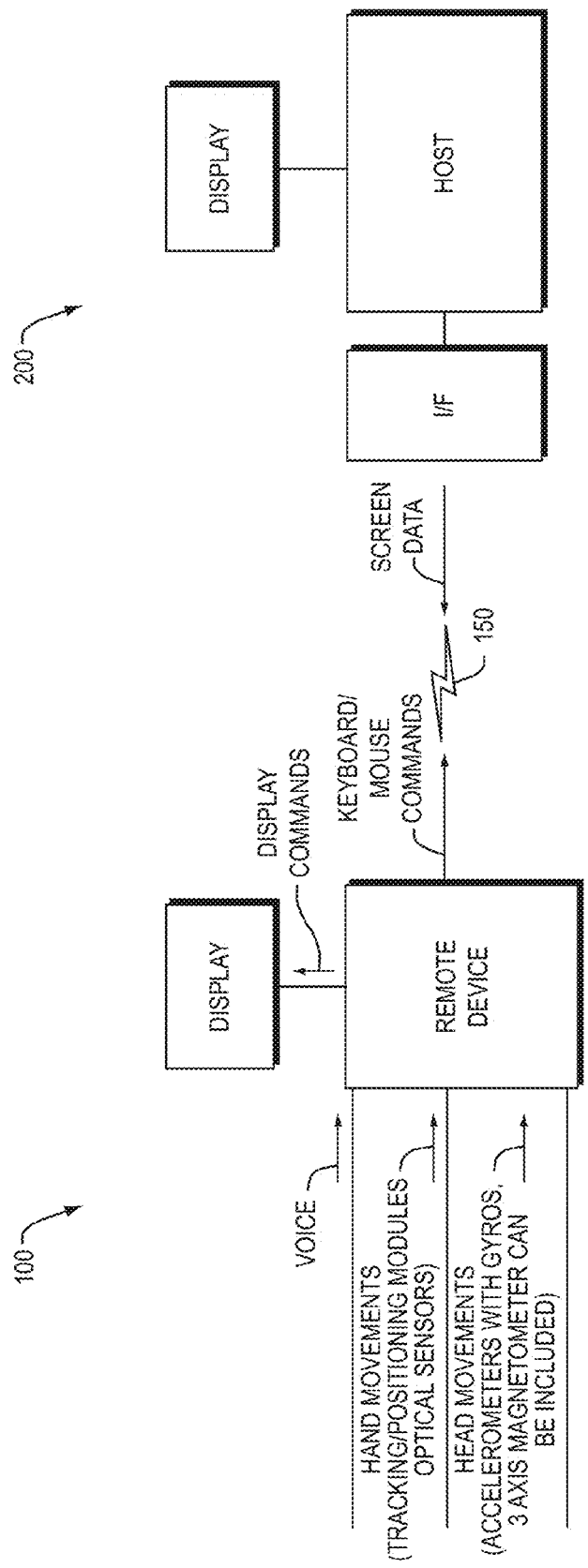
FIG. 2 is a block diagram of flow of data and control in the embodiment of FIGS. 1A-1B.

FIG. 2 is a block diagram showing more detail of an embodiment of the HSC or HMD device 100, host 200 and the data that travels between them. The HSC or HMD device 100 receives vocal input from the user via the microphone, hand movements or body gestures via positional and orientation sensors, the camera or optical sensor(s), and head movement inputs via the head tracking circuitry such as 3 axis to 9 axis degrees of freedom orientational sensing. These are translated by software (processors) in the HSC or HMD device 100 into keyboard and/or mouse commands that are then sent over the Bluetooth or other wireless interface 150 to the host 200. The host 200 then interprets these translated commands in accordance with its own operating system/application software to perform various functions. Among the commands is one to select a field of view 300 within the virtual display 400 and return that selected screen data to the HSC or HMD device 100. Thus, it should be understood that a very large format virtual display area might be associated with application software or an operating system running on the host 200. However, only a portion of that large virtual display area 400 within the field of view 300 is returned to and actually displayed by the micro display 1010 of HSC or HMD device 100.

In one embodiment, the HSC 100 may take the form of the device described in a co-pending US Patent Publication Number 2011/0187640, which is hereby incorporated by reference in its entirety.

In another embodiment, the invention relates to the concept of using a Head Mounted Display (HMD) 1010 in conjunction with an external 'smart' device 200 (such as a smartphone or tablet) to provide information and control to the user hands-free. The invention requires transmission of small amounts of data, providing a more reliable data transfer method running in real-time.

In this sense therefore, the amount of data to be transmitted over the connection 150 is small—simply instructions on how to lay out a screen, which text to display, and other stylistic information such as drawing arrows, or the background colors, images to include, etc.

Additional data could be streamed over the same 150 or another connection and displayed on screen 1010, such as a video stream if required by the host 200.

Figure 3:
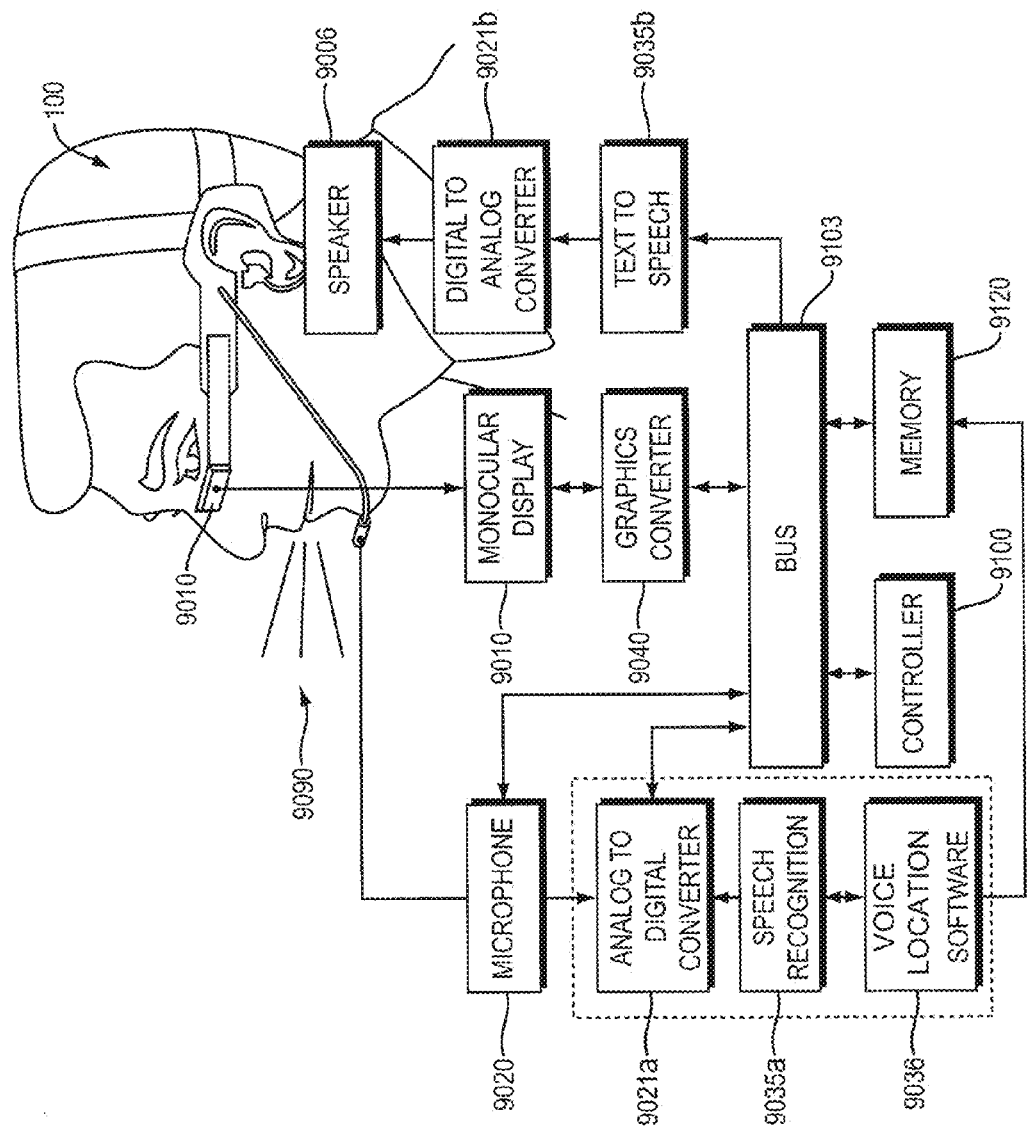
FIG. 3 is a block diagram of an automatic speech recognition (ASR) subsystem in embodiments.

FIG. 3 shows an example embodiment of a wireless hands-free video computing headset 100 under voice command, according to one embodiment of the present invention. The user may be presented with an image on the micro-display 9010, for example, as output by host computer 200 mentioned above. A user of the HMD 100 can additionally use voice location software module 9036, either locally or from a remote host 200, in which the user is presented with an image of a message box, text box or dialogue box prompting user input on the microdisplay 9010 and the audio of the same through the speaker 9006 of the headset computer 100. Because the headset computer 100 is also equipped with a microphone 9020, the user can utter the command words or phrase (command selection) as illustrated next with respect to embodiments of the present invention.

FIG. 3 shows a schematic diagram illustrating the modules of the headset computer 100. FIG. 3 includes a schematic diagram of the operative modules of the headset computer 100. For the case of voice location in speech driven applications controller 9100 accesses voice location module 9036, which can be located locally to each HMD 100 or located remotely at a host 200 (FIGS. 1A-1B).

Voice location software module 9036 contains instructions to display to a user an image of a pertinent message box or the like. The graphics converter module 9040 converts the image instructions received from the voice location module 9036 via bus 9103 and converts the instructions into graphics to display on the monocular display 9010.

At the same time, text-to-speech module 9035b converts instructions received from voice location software module 9036 to create sounds representing the contents for the image to be displayed. The instructions are converted into digital sounds representing the corresponding image contents that the text-to-speech module 9035b feeds to the digital-to-analog converter 9021b, which in turn feeds speaker 9006 to present the audio to the user. Voice location software module 9036 can be stored locally at memory 9120 or remotely at a host 200 (FIG. 1A).

Voice location software module 9036 contains instructions to display to a user an image of a pertinent message box or the like. The graphics converter module 9040 converts the image instructions received from the voice location module 9036 via bus 9103 and converts the instructions into graphics to display on the monocular display 9010. At the same time text-to-speech module 9035b converts instructions received from voice location software module 9036 to create sounds representing the contents for the image to be displayed. The instructions are converted into digital sounds representing the corresponding image contents that the text-to-speech module 9035b feeds to the digital-to-analog converter 9021b, which in turn feeds speaker 9006 to present the audio to the user. Voice location software module 9036 can be stored locally at memory 9120 or remotely at a host 200 (FIG. 1A). The user can speak/utter the command selection from the image and the user's speech 9090 is received at microphone 9020. The received speech is then converted from an analog signal into a digital signal at analog-to-digital converter 9021 a. Once the speech is converted from an analog to a digital signal speech recognition module 9035a processes the speech into recognized speech. The recognized speech is compared against known speech according to the instructions of the voice location module 9036.

A voice driven location system may be used, for example, in Explicit Location mode or Passive Location mode.

For Explicit Location (EL) mode, a device 100/module 9036 could explicitly ask the user to describe his location, for example by prompting the user with a list of known way-points. In one embodiment, HSC 100 presents a map of a region (e.g, a room or floor plan within a building) to the user, with certain items highlighted, such as "front-door," "back-door," "window," "microwave oven," and so on. The user then speaks a command, such as "I am standing next to the microwave oven." Based on such information the HSC 100/module 9036 looks up position information associated with the microwave oven, from a pre-populated database (e.g., from an absolute scale floor plan, a schematic, a map and/or GPS coordinates of the microwave oven), and uses the spoken command to reset the mobile user's device location, thereby creating an absolute fix. The pre-populated database may be stored, for example, in memory 9120.

Once the device location has been reset, dead reckoning or inertial navigation (e.g., accelerometer-based navigation) may take place until sufficient drift requires another absolute fix. Sufficient drift may be determined by comparing the actual drift to a predetermined threshold. The threshold may be preset, or it may be programmed by the user.

The scale floor plan, schematic, map and/or GPS coordinates of key items in and around a room or floor-plan may be known ahead of time, or may be calculable in real time. To be calculable in real time, the system 100 may employ both an accurate distribution floor-plan, and the GPS coordinates of certain aspects of (e.g., the corners of) the floor-plan. HSC 100 may then utilize interpolation, based on the relative item locations and the GPS coordinates (or other absolute coordinates) to calculate the position of all items within the floor-plan.

For Passive Location (PL) mode, the system 100 may be expanded to work passively, i.e., in the background. PL mode is based on the idea that a person, during the course of ordinary activities and conversations, may provide conversational clues as to his location. In PL mode, the HSC 100 monitors any ongoing utterances being made by the user, and extracts relevant utterances, rather that explicitly soliciting such utterances. Keyword spotting and natural language processing by HSC 100 is activated during PL mode, so that the HSC 100 may search for and find phrases such as "I'm coming up the stairs now," or "Hurry up, I'm waiting for you by the elevator," and similar phrases associated with location. Module 9036 may analyze these phrases and extract keywords such as "stairs" and "elevator," and other location reference words. Module 9036 cross-references the extracted location words with a reference plan that describes known objects in the current floor plan, schematic or map to transpose the extracted location words to an accurate floor plan, schematic, map and/or GPS locations. The reference plan may reside in a database or other such structure for storing an organized collection of data, stored, for example, in memory 9120. HMC 100 may match an extracted location word to a known object from the reference plan, and use coordinates of the known object from the reference plan to determine the user's/device location (i.e., the location of the HMC). The HMC 100 may reset device location according to those coordinates, as previously described.

FIG. 4 illustrates an embodiment of a method of enhancing a location system according to the invention, including recognizing 402 a user utterance as a description of an object disposed within a region, identifying 404 the object within a map of the region, extracting 406 locational coordinates associated with the object from the map of the region, and establishing 408 a location of the device based on the locational coordinates.

It will be apparent that one or more embodiments described herein may be implemented in many different forms of software and hardware. Software code and/or specialized hardware used to implement embodiments described herein is not limiting of the embodiments of the invention described herein. Thus, the operation and behavior of embodiments are described without reference to specific software code and/or specialized hardware—it being understood that one would be able to design software and/or hardware to implement the embodiments based on the description herein.

Further, certain embodiments of the example embodiments described herein may be implemented as logic that performs one or more functions. This logic may be hardware-based, software-based, or a combination of hardware-based and software-based. Some or all of the logic may be stored on one or more tangible, non-transitory, computer-readable storage media and may include computer-executable instructions that may be executed by a controller or processor. The computer-executable instructions may include instructions that implement one or more embodiments of the invention. The tangible, non-transitory, computer-readable storage media may be volatile or non-volatile and may include, for example, flash memories, dynamic memories, removable disks, and non-removable disks.

While this invention has been particularly shown and described with references to example embodiments thereof, it will be understood by those skilled in the art that various changes in form and details may be made therein without departing from the scope of the invention encompassed by the appended claims.

What is claimed is:
1. A headset computer device comprising:
a microdisplay driven by a processor;
a microphone coupled to provide user-voiced input to the processor; and
a voice location module, executed by the processor, configured to

(i) extract one or more location-related phrases from an ongoing user utterance that was produced during ordinary conversation, conveyed through the user-voiced input;
(ii) analyze the one or more location-related phrases to identify at least one location-related reference word; and
(iii) establish a location of the device based on the at least one location-related reference word.

2. The headset computer device of claim 1, wherein the processor resets the established location based on the user-voiced input.

3. The headset computer device of claim 1, wherein the voice location module is further configured to establish the location of the device within a three dimensional coordinate system.

4. The headset computer device of claim 1, wherein the user-voiced input is in response to a solicitation from the headset computer device.

5. The headset computer device of claim 1, wherein the headset computer device is further configured to extract the user-voiced input from unsolicited utterances.

6. The headset computer device of claim 1, wherein the user-voiced input includes information describing proximity to an object.

7. The headset computer device of claim 6, wherein the headset computer device is further configured to cross-reference the information describing proximity to an object with a reference plan of known objects.

8. The headset computer device of claim 6, wherein the headset computer device is further configured to identify a match between the information describing proximity to an object and a known object described in the reference plan.

9. The headset computer device of claim 1, wherein the headset computer is further configured to use inertial navigation to determine a subsequent location of the device, after the voice location module establishes the location of the device.

10. A method of enhancing a location system, comprising: by a digital processing device,
(i) extracting one or more location-related phrases from an ongoing user utterance that was produced during ordinary conversation;
(ii) analyzing the one or more location related phrases to identify at least one location-related reference word;
(iii) recognizing the location-related reference word as a description of an object disposed within a region;
(iv) identifying the object within a map of the region;
(v) extracting locational coordinates associated with the object from the map of the region; and
(vi) establishing a location of the device based on the locational coordinates.

11. The method of claim 10, further including resetting the established location based on the user voiced input.

12. The method of claim 10, further including establishing the location of the device within a three dimensional coordinate system.

13. The method of claim 10, wherein the description of the object includes proximity to an object.

14. The method of claim 10, wherein the user-voiced input is in response to a solicitation from the headset computer device.

15. The method of claim 10, wherein the headset computer device extracts the user-voiced input from unsolicited utterances.

16. The method of claim 10, wherein the user-voiced input includes information describing proximity to an object.

17. The method of claim 16, further including cross-referencing the information describing proximity to an object with a reference plan of known objects.

18. The method of claim 16, further including identifying a match between the information describing proximity to an object and a known object described in the reference plan.

19. The method of claim 10, further including using inertial navigation to determine a subsequent location of the device, after the voice location module establishes the location of the device.

20. A non-transitory computer-readable medium for recognizing speech, the non-transitory computer-readable medium comprising computer software instructions stored thereon, the computer software instructions, when executed by at least one processor, cause a computer system to:
(i) extract one or more location-related phrases form an ongoing user utterance that was produced during ordinary conversation;
(ii) analyze the one or more location related phrases to identify at least one location-related reference word;
(i) recognize the location-related reference word as a description of an object disposed within a region;
(ii) identify the object within a map of the region;
(iii) extract locational coordinates associated with the object from the map of the region; and
(iv) establish a location of a user who produced the user utterance based on the locational coordinates.

* * * * *